United States Patent [19]

Gross et al.

[11] 4,227,741

[45] Oct. 14, 1980

[54] BACKLASH FREE SEAT ADJUSTER

[75] Inventors: Josef Gross, Rockenhausen; Heinz Werner, Remscheid-Hasten; Volker Schmidt, Rockenhausen; Heinz P. Cremer, Remscheid, all of Fed. Rep. of Germany

[73] Assignee: Keiper Automobiltechnik GmbH & Co. KG, Remscheid-Hasten, Fed. Rep. of Germany

[21] Appl. No.: 973,540

[22] Filed: Dec. 26, 1978

[30] Foreign Application Priority Data

Dec. 24, 1977 [DE] Fed. Rep. of Germany ....... 2757907

[51] Int. Cl.$^2$ ..................... A47C 1/025; F16H 55/18
[52] U.S. Cl. ..................... 297/362; 16/143; 74/409; 74/804
[58] Field of Search ............... 297/362, 361, 373, 374, 297/354, 355; 74/804, 805, 406, 409; 16/143

[56] References Cited

U.S. PATENT DOCUMENTS

| | | | |
|---|---|---|---|
| 1,571,457 | 2/1926 | Orr | 74/805 X |
| 3,192,799 | 7/1965 | Pamplin | 74/805 |
| 4,025,109 | 5/1977 | Klingelhofer et al. | 297/362 X |

FOREIGN PATENT DOCUMENTS

| | | | |
|---|---|---|---|
| 329811 | 5/1930 | United Kingdom | 74/804 |
| 923508 | 4/1963 | United Kingdom | 74/804 |

*Primary Examiner*—William E. Lyddane
*Attorney, Agent, or Firm*—Michael J. Striker

[57] ABSTRACT

The articulated mountings for vehicle seats includes two hinged parts, one part being formed with a spur gear and the other part with a geared rim of larger diameter and engaging the teeth of the spur gear. The gear rim is mounted for rotation on a pivot axle. The axle supports for joint rotation an eccentric disk which in turn supports for rotation the spur gear. To eliminate backlash in the bearing surfaces and in the meshing teeth of the gears, the eccentric disk is coupled to the pivot axle on a non-circular coupling section which engages two opposite sides of the eccentric recess in the eccentric disk but permits radial displacement of the latter. A setting mechanism preferably in the form of a resilient cushion or in the form of a biasing spring keeps the eccentric disk in its eccentric position.

10 Claims, 9 Drawing Figures

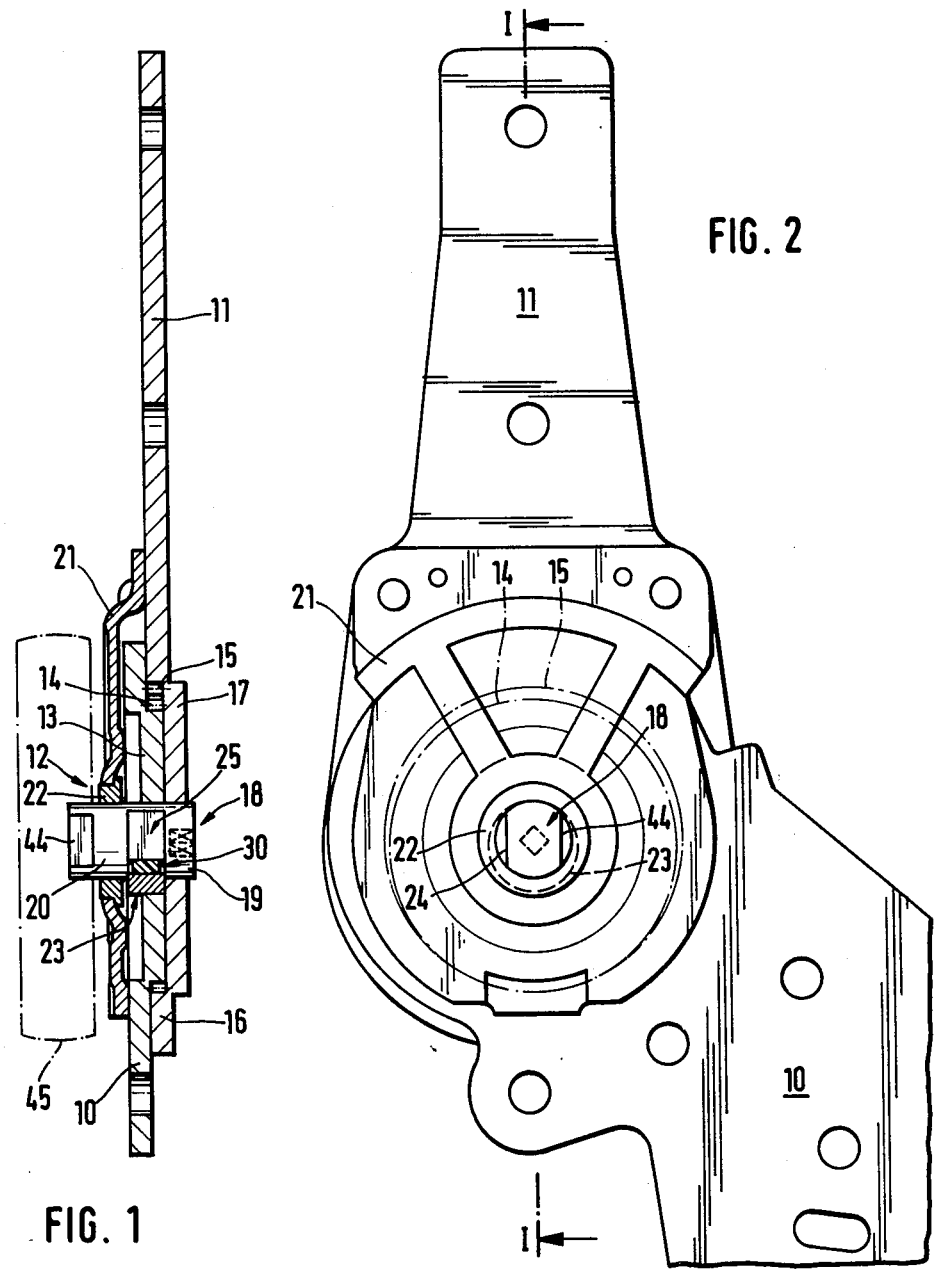

BACKLASH FREE SEAT ADJUSTER

BACKGROUND OF THE INVENTION

This invention relates generally to seat adjusters, and more specifically it relates to an articulated mounting for reclinable backrests of a seat, especially a motor vehicle seat having a stationary hinge part assigned to the seat and a rotatable hinge part assigned to the backrest and connected to the stationary hinge part by means of a pivot axle. The angular position of the two hinge parts is defined by means of an adjustable arresting device in the form of wobble gears which include an eccentric member which is carried on a non-circular coupling section of the pivot axle. The eccentric member supports one of the wobble gears and its eccentricity defines the point of engagement of the teeth of the wobble gears.

In prior art articulated mountings of the aforedescribed type, the adjustment shaft has a section provided with a wedge-like surface which is surrounded by an eccentric member having also an inclined surface cooperating with the wedge surface of the adjustment section of the shaft. The eccentric member supports for rotation a spur gear provided in one hinge part of the articulated mounting, the spur gear being in mesh with a geared rim provided in the other hinge part of the mounting and forming therewith the aforementioned wobble gears. The pivot axle is axially displaceable and its adjusting section is spring-loaded in a direction in which it increases the eccentricity of the eccentric bushing. The biasing spring means acting in the direction of eccentricity urge the wobble gears into their engagement point without any blacklash so that rattle-proof arresting of the mounting parts in their adjusted position is insured. The control handle or wheel which is rotatably connected to the pivot axle has in its hub portion a diametrally extending groove, the bottom surface of which is provided with a correspondingly diametrally directed recess. This recess in the position of the pivot axle in which the eccentric member is locked accommodates projections of the pivot axle which by lifting the handle and turning it about a minute angle abut against the bottom surface of the recess in the handle. In doing so, the adjustment section is slightly shifted in axial direction against the force of the spring means opposite the eccentric member to relieve the latter so that any play between the wedge surfaces of the adjusting section and the collar-shaped eccentric member on the one hand, and between the teeth of the wobble gears on the other hand, can be adjusted so that the adjustment of the angular position of the articulated mounting members can be effected with minimum force. Nonetheless, the advantage of an easy operation of the control lever during the adjusting and arresting process of the wobble gears resulting from the elimination of any play of the wobble gears in the rest condition of the articulated or hinge mounting, is outweighed by the necessity of employing a relatively large number of additional structure elements requiring a relatively large construction space and especially resulting in a considerably increased depth of the hinge mounting structure. In addition, the manufacture of these parts and their assembly into the completed hinge mount is expensive so that this expenditure, which achieves merely a limited operational ease during the adjustment process of the articulated mountings, seems in many cases unjustified.

SUMMARY OF THE INVENTION

It is, therefore, a general object of the present invention to overcome the aforementioned disadvantages.

More particularly, it is an object of the invention to provide an articulated mounting of the above-described type in which the teeth of wobble gears in the point of their engagement are free from play and also in which the bearing surfaces of the pivot axle and of the eccentric member is without backlash.

A further object of the invention is to provide an improved articulated mounting of the above-described type which can be manufactured inexpensively and by simple means.

A further object of the invention is to provide such an improved mount which can be easily assembled and maintained.

In keeping with these objects, and others which will become apparent hereafter, one feature of the invention resides in the provision of a pivot axle which has a non-circular coupling section which supports the eccentric member and against which the eccentric member is adjustable in radial direction.

By this means, it is possible to positively neutralize the backlash in the teeth and bearings of the wobble gears resulting from unavoidable manufacturing tolerances and during the assembly of the hinge mountings. The seat user, therefore, does not need to lock the eccentric member after each adjustment of the backrest. By virtue of the locking adjustment of the eccentric member which takes place in radial direction of the latter, it is possible to achieve minimum structural depth of the hinge mounting so that a reduced space is necessary for the installation of the mountings on the motor vehicle seat. Inasmuch as no axial movement of the pivot axle is required for compensating the backlash the free space for operating the control handle can also be minimized and the saved space can be utilized for example for increasing the breadth of the seat or for equipping the same with safety means such as lateral cushions and the like.

In order to adapt the eccentricity of the eccentric member so as to compensate for play resulting from unavoidable manufacturing tolerances and for the corresponding eccentricity between the gear rim of one mounting part having internal teeth and the spur gear of the other mounting part, the pivot axle in one exemplary embodiment of this invention has a coupling range in the form of a rectangular pin that engages an eccentrically situated rectangular recess in the eccentric member, whereby two opposite walls of the rectangular recess contact the corresponding opposite sides of the rectangular pin to provide a coupling for joint rotation, whereas the remaining opposite walls of the recess are spaced apart from the assigned sides of the rectangular pin so as to enable the adjustment of the eccentricity of the member in a maximal possible range. As mentioned above, the adjustment of the eccentricity takes place in radial direction of the eccentric member. In one embodiment the settling member for adjusting the eccentricity is the adjustment screw arranged in a threaded hole passing in radial direction through the eccentric member, the screw projecting into the free space between the inner wall of the recess and the opposite side of the pin and is screwed as far as to urge the eccentric member in the direction if its maximum eccentricity.

In another embodiment of this invention, the settling member for adjusting the eccentricity is a cushion-like elastic member disposed in the free space between the rectangular pin of the pivot axle and the wall of the recess in the eccentric member, so that the eccentricity between the pivot axle and the eccentric member is always maintained without the necessity of using separate adjustment operation of the adjustment member. The cushion-like elastic member can be compressed only during the assembly of the hinged mounting so that the insertion of the pivot axle together with the eccentric member into the bearing opening of individual mounting members is facilitated. In addition, due to the elasticity of the cushion-like member the eccentricity is automatically adjusted even if bearing surfaces and teeth of the wobble gears do become worn out during their use and an increased backlash occurs.

Even if it is feasible to journal laterally into one of the two hinge mountings a single section of the pivot axle, it is more advantageous when the pivot axle has two concentrically arranged bearing sections between which a central section for supporting the eccentric member takes place. To provide a pivot axle of this kind the axle is, according to another feature of the invention, divided perpendicularly to its longitudinal axis and the eccentric member is arranged between two axle sections. One of the sections has the aforementioned rectangular pin which projects through the rectangular recess in the eccentric member and further engages a rectangular recess in the other pivot axle section, the latter recess contacting all sides of the rectangular pivot pin. The divided pivot axle can then be united into a compact structural unit by means of a screw connection in an axial boring in both pivot axle sections.

In a particularly advantageous embodiment for facilitating the assembly, the pivot axle is made of two mutually connected sections and the coupling range is formed with two parallel coupling surfaces between which extends a perpendicular supporting surface cooperating with springing means. The coupling surfaces as well as the supporting surface are surrounded by an eccentric disk having a C-shaped configuration and lockingly engaging the coupling surfaces and bridging at a distance the supporting surface.

In order to achieve the self-adjustment and the self-arresting of the eccentric member, it is recommended that a cushion-like resilient member be arranged between the supporting surface in the coupling range of the pivot axle and the bridging surface of the eccentric disk. To facilitate the installation of the cushion-like member which acts as the eccentricity adjusting element, without sacrificing the rigidity of the pivot axle also when eccentric members of small eccentricity are employed and in addition to avoid the compression of the cushion-like member beyond its limits of elasticity during the installation, the bridging surface of the eccentric disk is provided according to still another feature of this invention with a recessed space for accommodating the cushion-like resilient member. This cushion-like member can be in the form of a spring, for example such as a resilient body, a pressure spring, an elastic body or a rubber body.

According to still another feature of this invention, the coupling range of the pivot axle is made as a circular eccentric section which overlaps from one side the outer circumference of both pivot axle sections and having two parallel flat portions extending in the direction of eccentricity and between which a recess is arranged extending also in the direction of eccentricity and accommodating in this direction a spring-loaded adjusting member; the eccentric section is surrounded by a bushing or collar having coupling surfaces which in the direction of the eccentricity exhibit backlash with the axle. The adjusting member is made preferably as a head bolt having a spherical head surface, whereby the end portion of the shaft of the bolt is engageable with a cutout in the bottom of the recess in the eccentric section so that lock-free and reliable guiding in the direction of the eccentricity is insured. In order to exert relatively large adjusting forces in a limited space, the spring for loading the adjusting member is made preferably as a set of disk springs.

By using in the eccentric range closed bushings serving as a bearing ring, it is possible to employ a sliding bearing or a roller bearing for rotatably supporting the pivot axle so that frictional forces are reduced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a sectional view of one embodiment of an adjustable hinged mounting according to this invention, taken along line I—I of FIG. 2 and showing a one-piece pivot axle supporting at its intermediate section an eccentric member;

FIG. 2 is a rear view of the hinged mounting of FIG. 1;

FIG. 4a is a modification of the pivot axle of FIG. 4;

DESCRIPTION OF THE PREFERRED EMBODIMENTS

Figure 4:
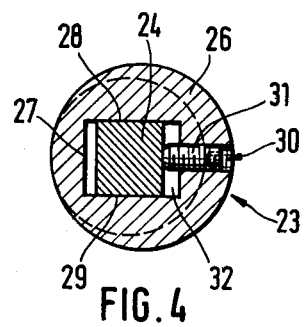
FIG. 4 is a sectional view of the pivot axle of FIG. 3, taken along line IV—IV.

Referring first to FIGS. 1 and 2, the illustrated articulated mounting of this invention includes stationary hinge part 10 adapted for being secured to the seat part of a vehicle seat and a reclinable hinge part 11 for being secured to the backrest of the vehicle seat. Both hinge parts 10 and 11 are rotatably connected one to another by means of a backrest adjuster 12. This backrest adjuster includes a spur gear 13 with external teeth 14 formed by stamping, for example. Toothing 14 of spur gear 13 is in engagement with internal teeth 15 of a gear rim 16 formed also by stamping, for example, in the other hinge part 11. The diameter of the crown line of the external teeth 14 is smaller by at least about the depth of its teeth than the diameter of the root line of the internal teeth 15 of the gear rim 16. Accordingly, teeth 14 and 15 have different number of teeth, whereby the number of internal teeth 15 is at least about one tooth larger than the number making up the external teeth 14. This arrangement of wobble gears 13 and 16 is selected such that internal teeth 15 of hinge part 11 can roll on the external teeth 14 of spur wheel 13 of hinged part 10.

Disk 17 resulting from stamping the internal teeth 15 on hinged part 11 is rotatably supported on section 19 of pivot axle 18. Another axle section 20 is defined on the other end portion of axle 18. This axle section 20 is supported for rotation in a cover plate 21 which is fixedly connected, for example by means of rivets, to hinge part 11 and covers hinge part 10 in the range of its spur gear 13. Axle section 20 rotates preferably in a bearing bushing 22 which is pressed into a corresponding opening in cover plate 21. Axle sections 19 and 20 are thus rotatable about a common axis. An eccentric member 23 is arranged between the axle sections 19 and 20 and spur gear 13 of hinge part 10 is supported for rotation thereon. The eccentricity of the eccentric member 23 with respect to the axis of rotation of pivot axle 18 corresponds substantially to the difference between the radius of the root line of the internal teeth 15 and the radius of the crown line of the external teeth 14.

Due to unavoidable manufacturing tolerances, a backlash takes place in the meshing of external teeth 14 and internal teeth 15 provided that the eccentric member 23 is rigidly supported on pivot axle 18. In the event that the backrest of the seat is unloaded, this backlash causes rattling noises in the articulated mounting resulting from the transmission of vibrations from the vehicle to the seat. According to this invention, these noises are eliminated by adjustably mounting the eccentric member 23 on pivot axle 18 as it will be explained below with reference to FIGS. 3–6.

Figure 3:
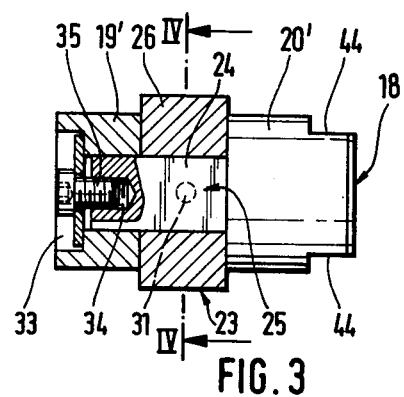
FIG. 3 shows in a sectional view a two-piece pivot axle for the two hinge parts and which supports in its intermediate range an eccentric member in the form of a ring-shaped body.

As seen from an exemplary embodiment of pivot axle 18 in FIGS. 3 and 4, the pivot axle is assembled of two axle sections 19' and 20'. Axle section 20' has a coupling range 25 in the form of a rectangular pin 24 on which eccentric member 23 is inserted. The eccentric member 23 in the embodiments of FIGS. 3 and 4 consist of a circular disk 26 having an eccentrically arranged rectangular recess 27. The configuration of this recess 27 is such that two opposite sides 28 and 29 are in slidable contact with the corresponding sides of rectangular pin 24, whereas the other oppposite sides or walls of the recess are spaced apart from the facing sides of the rectangular pin 24 so as to insure maximum eccentricity of the disk 26 relative to the center of rectangular pin 24. Under the definition of the maximum eccentricity is to be understood the feature that eccentric member 23 can be displaced in the direction of its eccentricity and relative to the center of rotation of pivot axle 18 about a distance which exceeds the difference between the radius of the root line of the internal teeth 15 and the radius of the crown line of external teeth 14. This maximum eccentricity can be adjusted and maintained by an adjusting member 30 arranged between eccentric member 23 and rectangular pin 24.

This eccentricity adjusting member 30 in the example of FIGS. 3 and 4 is a setting screw 31 passing through a threaded hole in eccentric disk 26 and engaging the opposite side of rectangular pin 24. In a modification as shown in FIG. 4a, the setting screw 30 could be replaced by a resilient cushion-like member 42 which is inserted in a free space 32 between the rectangular pin 24 and the opposite wall in recess 27 of circular disk 26. The resilient force of the cushion-like member is selected such that ring-shaped disk 26 is always urged into its extreme position in contact with one side of the rectangular pin 24, whereas the opposite side is urged by the spring force away from one another. In this manner, the cushion-like resilient member automatically adjusts the maximum eccentricity without the need of any adjustment operation so that via spur gear 13 the backlash between the external teeth 14 of the spur gear and the internal teeth 15 of the gear rim 16 is eliminated and remains eliminated in any load condition of the backrest.

Rectangular pin 24 of axle section 20' projects through the recess 27 in eccentric member 23 and engages a central rectangular boring in axle section 19'. This central rectangular boring has the same cross-section as the rectangular pin 24 except its end part 33 which is increased in size and opens into the free face of axle section 19'. The projecting rectangular pin 24 ends a small distance before the flange between the central bore and its increased end portion and is provided with a threaded central bore 34 which engages fastening screw 35. The head of screw 35 rests on a washer located in the end portion 33 of the central bore and firmly connects the opposite faces of respective axle sections 19' and 20' against the eccentric disk 26.

Figure 6:
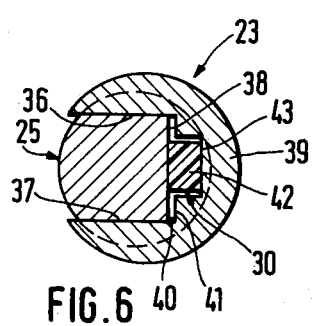
FIG. 6 is a sectional view of the axle of FIG. 5 taken along line VI—VI.
Figure 5:
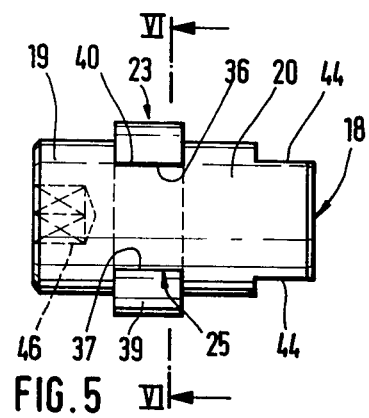
FIG. 5 shows a one-piece pivot axle supporting on its intermediate section a C-shaped eccentric member.

In the embodiment as shown in FIGS. 5 and 6 axle 18 is made as a one-piece member where sections 19 and 20 have the same diameter and are integral with the intermediate section forming the coupling range 25 is formed with two juxtaposed coupling surfaces 36 and 37 and with an abutment surface 38 formed perpendicularly to both coupling surfaces in the central range of the pivot axle. The coupling range 25 of pivot axle 18 is surrounded by a C-shaped eccentric disk 39 which has at one side a rectangular recess 40, the opposite inner walls of which abut against respective coupling surfaces 36 and 37. The bottom wall 41 of recess 40 is spaced apart from the abutment surface 38 of the coupling range 25. An elastic cushion member 42 is inserted into the adjustable space 43 between the bottom wall 41 and the abutment side 38. This free space 43 is dimensioned such as to be slightly broader than the cushion member 42, the latter, however, exceeding in size the maximum radial dimension of this free space 43. Due to these dimensional differences, the elastic cushion member 42 urges the eccentric disk 39 away from abutment surfaace 38 of axle 18 and the end portions of the C-shaped eccentric disk firmly rest on the curved peripheral portion of the coupling range 25. The function of cushion member 42 is the same as the function of the aforedescribed adjusting screw in the embodiment of FIGS. 3 and 4.

In the described embodiments of pivot axle 18, the axle section 20 or 20' has two opposite flat surfaces 44 serving for coupling for joint rotation a control lever or a control wheel 45 indicated by dash-dot lines in FIG. 1. The other axle section 19 has a non-circular axle boring 46 which serves for engaging a non-illustrated transmission rod connecting a corresponding pivot axle in the opposite hinge mounting secured to the other side of the vehicle seat.

Figure 8:
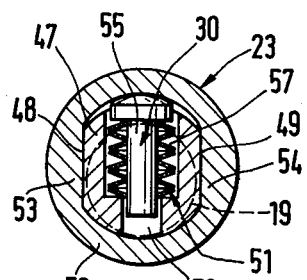
FIG. 8 is a sectional view of pivot axle of FIG. 7 taken along line VIII—VIII.
Figure 7:
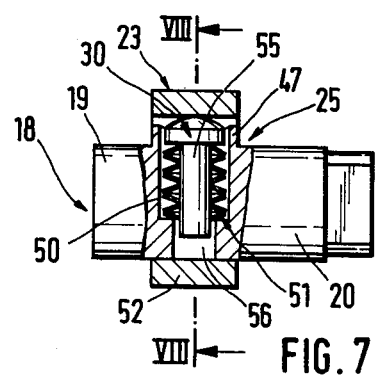
FIG. 7 is a partly sectional view of another embodiment of a one-piece pivot axle in which the eccentric section is made in the form of a closed bushing.

In the example according to FIGS. 7 and 8 pivot axle 18 has again a coupling range 25 forming an intermediate axle section 47 for supporting an eccentric member which is again arranged between axle sections 19 and 20 and integrally connected thereto. The eccentric section 47 projects above axle sections 19 and 20 at two opposite points whereby at one point the eccentricity is double of that in the opposite point. The intermediate coupling range 25 is provided with two opposite flat surfaces 48 and 49. In the direction of maximum eccentricity of eccentric member 23, the intermediate range has a radial boring 50 which at one end 56 is reduced in diameter. Both boring portions 50 and 56 accommodate an adjusting or setting member 30 in the form of a head bolt 55 which is spring-biased by a set of springs 51 resting on the flange between the boring portion 56 of smaller diameter and the boring portion 50 of larger diameter. Individual springs in the set of springs 51 are preferably in the form of disk springs 57. Adjusting bolt 55 has a semispherical head which is slidably guided in boring 50, whereby the opposite end portion of the bolt shaft is guided in boring portion 56 of smaller diameter. In this embodiment, eccentric member 23 is in the form of a bushing or collar 52 having a larger diameter than the diameter of intermediate coupling range 25 of pivot axle 18 so that a backlash takes place between eccentric member 23 and the pivot axle. This backlash is compensated by the spring-biased setting bolt 55, the head of which is urged in the direction of boring 50 against the inner wall of the eccentric bushing 52 and consequently no backlash can take place between outer teeth 14 of spur gear 13 and the inner teeth 15 of gear rim 16. Similarly, any play between bearing surfaces of pivot axle 18 is automatically compensated by the action of the spring-loaded setting bolt 55. The eccentric bushing 52 has two opposite coupling surfaces 53 and 54 adapted for engaging the corresponding flat surfaces 48 and 49 on the eccentric section 47 of pivot axle 18 and consequently are connected for joint rotation with the latter.

It will be understood that each of the elements described above, or two or more together, may also find a useful application in other types of constructions differing from the types described above.

While the invention has been illustrated and described as embodied in specific examples of the articulated hinge for vehicle seats, it is not intended to be limited to the details shown, since various modifications and structural changes may be made without departing in any way from the spirit of the present invention. For instance, an elastic body of synthetic material or a pressure spring can be used as cushioning member 42. Besides, instead of spur gear 13, the disk 17 of gear rim 16 can be supported for rotation on eccentric member 23. In this case the spur gear 13 is rotatably mounted on one of the two coaxial axle sections 19 or 20 or 19' or 20'.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In an articulated mounting for seats having angularly adjustable backrest, particularly for use in motor vehicle seats, including a stationary hinge part assigned to the seat and a reclinable hinge part assigned to the backrest, a pivot axle for connecting the hinge parts, and an angular position adjuster and arrester in the form of wobble gears including an inner gear connected to one hinge part and being rotatable about said pivot axle, an outer gear connected to the other hinge part and being rotatable about an eccentric member coupled for rotation with the pivot axle, a combination according to a non-circular coupling section on said pivot axle; said eccentric member being a separate piece having an eccentric recess, two opposite walls of said recess slidably engaging corresponding sides of said non-circular coupling section to permit radial displacement of the eccentric member on said coupling section; means for adjusting and arresting the eccentric position of said eccentric member relative to said coupling section of said pivot axle; and wherein said non-circular coupling section of said pivot axle is a rectangular pin, said eccentric member having a rectangular recess, the two opposite walls of which slidably engage corresponding sides of said rectangular pin and the other opposite walls of said recess being spaced apart from the facing sides of said pin to define a free space therebetween, and said adjusting means being arranged in said free space.

2. The combination as defined in claim 1, wherein said eccentric member is a circular disk having a radial threaded boring communicating with said eccentric rectangular recess, and said adjusting means being a setting screw engaging said threaded radial boring and abutting with its free end against the opposite side of said pin.

3. The combination as defined in claim 1, wherein said adjusting means is a resilient chushion, disposed in said free space between one side of said rectangular pin and the opposite wall of said rectangular recess.

4. In an articulated mounting for seats having angularly adjustable backrest, particularly for use in motor vehicle seats, including a stationary hinge part assigned to the seat and a reclinable hinge part assigned to the backrest, a pivot axle for connecting the hinge parts, and an angular position adjuster and arrester in the form of wobble gears including an inner gear connected to one hinge part and being rotatable about said pivot axle, an outer gear connected to the other hinge part and being rotatable about an eccentric member coupled for rotation with the pivot axle, a combination comprising a non-circular coupling section on said pivot axle; said eccentric member being a separate piece having an eccentric recess, two opposite walls of said recess slidably engaging corresponding sides of said non-circular coupling to permit radial displacement of the eccentric member on said coupling section; means for adjusting and arresting the eccentric position of said eccentric member relative to said coupling section of said pivot axle; and wherein said pivot axle includes two separate sections divided along a plane perpendicular to the central axis of said axle, one of said axle sections being integrally connected with a rectangular pin defining said coupling section, said eccentric member being a circular disk having an eccentric rectangular recess engaging with its two opposite walls said rectangular pin and permitting radial movement in the direction of its other two walls, and the other axle section having a central rectangular recess matching said rectangular pin.

5. In an articulated mounting for seats having angular adjustable backrest, particularly for use in motor vehicle seats, including a stationary hinge part assigned to the seat and a reclinable hinge part assigned to the backrest, a pivot axle for connecting the hinge parts, and an angular position adjuster and arrester in the form of wobble gears including an inner gear connected to one hinge part and being rotatable about said pivot axle, an outer gear connected to the other hinge part and being rotatable about an eccentric member coupled for rotation with the pivot axle, a combination comprising a non-circular coupling section on said pivot axle; said eccentric member being a separate piece having an eccentric recess, two opposite walls of said recess slidably engaging corresponding sides of said non-circular section to permit radial displacement of the eccentric members on said coupling section; means for adjusting and arresting the eccentric position of said eccentric member relative to said coupling section of said pivot axle; and wherein said pivot axle is a one-piece axle defining at each end thereof an axle section and a coupling section therebetween, said coupling section including two opposite parallel coupling surfaces and an abutment surface arranged perpendicularly to the coupling surfaces in the central range of the axle, said eccentric member being a C-shaped disk defining a recess having two opposite flat surfaces matching said coupling surfaces on said axle, said adjusting means being arranged between said abutment surface of said intermediate range and the bottom of the recess of said C-shaped eccentric ring.

6. The combination as defined in claim 5, wherein said adjusting means is a resilient cushion member disposed in the free space resulting between said abutment surface in the coupling range of the pivot axle and the bottom surface in the C-shaped recess of said eccentric disk.

7. The combination as defined in claim 6, wherein the bottom of said C-shaped recess in the eccentric disk has a recessed portion for accommodating said cushion member.

8. In an articulated mounting for seats having angularly adjustable backrest, particularly for use in motor vehicle seats, including a stationary hinge part assigned to the seat and a reclinable hinge part assigned to the backrest, a pivot axle for connecting the hinge parts, and an angular position adjuster and arrester in the form of wobble gears including an inner gear connected to one hinge part and being rotatable about said pivot axle, an outer gear connected to the other hinge part and being rotatable about an eccentric member coupled for rotation with the pivot axle, a combination comprising a non-circular coupling section on said pivot axle; said eccentric member being a separate piece having an eccentric recess, two opposite walls of said recess slidably engaging corresponding sides of said non-circular coupling section to permit radial displacement of the eccentric member on said coupling section; means for adjusting and arresting the eccentric position of said eccentric member relative to said coupling section of said pivot axle; and wherein said pivot axle is a one-piece axle defining two lateral sections and a coaxial coupling section, said coupling section having two opposite coupling surfaces extending in the direction of eccentricity, a radial boring connecting said coupling surfaces and adapted for slidably guiding a spring-biased adjusting member, said eccentric member being in the form of a collar surrounding said coupling section and having a larger inner diameter than is the other diameter of said coupling section, said spring-biased adjusting member abutting against the inner wall of said collar and holding the latter in the eccentric position.

9. The combination as defined in claim 8, wherein said adjusting member is a bolt having a semi-spherical head abutting against the inner wall of said eccentric collar, said radial boring having a reduced end portion for guiding the stem of said adjusting bolt, and further including a biasing spring between the flange in the radial boring and the semi-spherical head of the bolt.

10. The combination as defined in claim 9, wherein said biasing spring is a set of disk springs.

* * * * *